US005115899A

United States Patent [19]

Nakatani

[11] Patent Number: 5,115,899

[45] Date of Patent: May 26, 1992

[54] DUAL-SPEED ESCALATOR APPARATUS

[75] Inventor: Hiroshi Nakatani, Inazawa, Japan

[73] Assignee: Mitsubishi Denki Kabushiki Kaisha, Tokyo, Japan

[21] Appl. No.: 641,929

[22] Filed: Jan. 16, 1991

[30] Foreign Application Priority Data

Jan. 16, 1990 [JP] Japan .................................... 2-6775

[51] Int. Cl.[5] .............................................. B65G 23/00

[52] U.S. Cl. ..................................... 198/334; 198/324

[58] Field of Search ................ 198/324, 330, 333, 334

[56] References Cited

U.S. PATENT DOCUMENTS

| | | | |
|---|---|---|---|
| 950,796 | 3/1910 | Seeberger | 198/333 X |
| 1,023,443 | 4/1912 | Seeberger | 198/324 |
| 3,672,484 | 6/1972 | Angioletti et al. | 198/334 |
| 3,939,959 | 2/1976 | Dunstan et al. | 198/334 |
| 4,066,161 | 1/1978 | Michalon et al. | 198/334 |
| 4,197,933 | 4/1980 | Dunstan et al. | 198/334 |
| 4,240,537 | 12/1980 | Dunstan | 198/334 |
| 4,284,191 | 8/1981 | Lavau | 198/334 X |
| 4,732,257 | 3/1988 | Mathis et al. | 198/334 |

FOREIGN PATENT DOCUMENTS

| | | |
|---|---|---|
| 2015306 | 2/1972 | Fed. Rep. of Germany . |
| 2354887 | 5/1975 | Fed. Rep. of Germany . |
| 2852772 | 10/1984 | Fed. Rep. of Germany . |
| 243572 | 8/1990 | Fed. Rep. of Germany . |

*Primary Examiner*—Robert P. Olszewski

*Assistant Examiner*—James R. Bidwell

*Attorney, Agent, or Firm*—Leydig, Voit & Mayer

[57] ABSTRACT

A dual-speed escalator apparatus comprises a main frame defining an elongated sloped circulating path, a plurality of steps disposed along the circulating path and dual link assemblies each including a first and a second link. The first and second links each have one end pivotally connected to a front roller shaft on a step, and the other end of the first link has a link roller and is pivotally connected to the other end of the second link on a neighboring step. A front roller guide rail extends along the circulating path, a rear roller guide rail is disposed along the front roller guide rail for maintaining the steps in a predetermined position, and a folding rail is disposed along the front roller guide rail for guiding the link rollers on the dual link assembly and for folding the dual link assembly into a folded position at the end portions of the circulating path. Intermediate plates are provided each having a first end in engagement with one of the steps and a second end in slidable engagement with neighboring step. The intermediate plates are positioned between the steps when the dual link assembly is expanded in an elongated intermediate portion of the main frame. Alternatively, a step chain having a rack may be disposed along the circulating path to correct the steps in an endless loop, and a drive unit for driving the step chain may be mounted at a midpoint of the length of the main frame.

20 Claims, 10 Drawing Sheets

DUAL-SPEED ESCALATOR APPARATUS

BACKGROUND OF THE INVENTION

This invention relates to an escalator apparatus and more particularly to a dual-speed escalator apparatus in which the steps on which passengers are conveyed travel at a slower speed at upper and lower landing sections and at a higher speed in an intermediate sloped section.

FIGS. 13 and 14 illustrate a dual-speed moving walk which is disclosed in Japanese Patent Publication No. 61-44795 and which can be applied to an escalator apparatus. In the figures, reference numeral 1 indicates a main frame, 2 indicates an endless step chain movable in an endless circulating path defined on the main frame 1, *2a* indicates a dual link assembly including two links *2b* pivotally connected at one end to each other by a step axle *2c*, the dual link assembly *2a* constituting a main component of the step chain 2, and *2d* indicates a connecting shaft pivotally connecting the other end of the links *2b* remote from the step axle *2c* of the neighboring dual link assembly *2a*. Reference numeral 3 indicates a series of tread boards each supported by the step axle *2c*, and 4 indicates a substantially endless guide rail mounted to the main frame 1 for guiding a guide roller on the connecting shaft *2c*. Reference numeral 5 indicates a speed-changing rail disposed on the main frame 1 inside of the guide rail 4 for guiding the roller on the connecting shaft *2d*. As best illustrated in FIG. 13, the speed-changing rail 5 is disposed away from and in parallel to the guide rail 4 at the end portions of the main frame 1 to define a low-speed section *5a*. The speed-changing rail 5 is slanted toward the guide rail 4 to define a transition or speed-changing section *5b*. The speed-changing rail 5 is disposed close to and in parallel to the guide rail 4 in the intermediate section of the main frame 1 to define a high-speed section *5c*. Reference numeral 6 indicates a drive unit disposed in the high-speed section *5c* of the speed-changing rail 5 in the middle portion of the main frame 1, *6a* indicates an endless drive chain driven by the drive unit 6 and having an engaging portion *6b* for engaging the connecting shaft *2d*, and 7 indicates a passenger conveyed by the tread board 3.

The links *2b* of the dual link assembly *2a* are arranged to define an angle A therebetween as shown in FIG. 14 throughout the length of the step chain 2, and as the drive unit 6 is rotated clockwise, for example, the drive chain *6a* is driven to drive the step chain 2 in the direction of arrow B in FIG. 13 as the engaging portion *6b* meshes with the connecting shaft *2d*. In the low-speed section *5a* at one of the landings of the moving walk, the distance between the guide rail 4 and the speed-changing rail 5 is relatively wide and the angle A between the links *2b* of the dual link assembly 2 is small, so the step chain 2 is driven at a low constant speed in this low-speed section *5a*. In the speed-changing section *5b*, the distance between the guide rail 4 and the speed-changing rail 5 is gradually decreased and the angle A is gradually decreased, so the step chain 2 is accelerated to a higher speed. In the high-speed section *5c*, the distance between the rails 4 and 5 is small and the step chain 2 is driven at a high constant speed. As the step chain 2 driven at a high speed in the high-speed section *5c* enters into the speed-changing section *5b* at the opposite end, the chain 2 is decelerated to a constant low speed at which the step chain 2 is driven in the low-speed section *5a*. The step chain 2 is then returned to the starting position through the turn-around section and the return run of the circulating path.

In the above-described conventional dual-speed moving walk, the links *2b* of the dual link assembly 2 are in a folded position defining the angle A therebetween even in an high-speed section *5c* in which the step chain 2 is engaged by the drive chain *6a*. This angle A between the links *2b*, which is determined by the distance between the guide rail 4 and the speed-changing rail 5, is not uniform and differs from one dual link assembly to another due, for example, to assembly errors in the guide rail 4. This causes the drive chain *6a* to fail to smoothly engage the connecting shaft *2d*, generating vibrations and noise. Also, the slidable tread board structure in which the distance between the tread boards is changed by sliding the tread boards relative to each other is difficult to apply to escalators in which the circulating path is sloped.

SUMMARY OF THE INVENTION

Accordingly, one object of the present invention is to provide a dual-speed escalator apparatus free from the above-discussed problems of conventional dual-speed conveyors.

Another object of the present invention is to provide a dual-speed escalator apparatus which operates smoothly and silently.

Another object of the present invention is to provide a dual-speed escalator apparatus which has a relatively simple structure.

A further object of the present invention is to provide a dual-speed escalator apparatus which has a relatively simple structure.

With the above objects in view, the dual-speed escalator apparatus of the present invention comprises a main frame defining an elongated sloped circulating loop path having an upper load-bearing run and a lower return run. A plurality of steps are connected in an endless loop by a variable connecting mechanism and disposed along the circulating loop path on the main frame. Intermediate plates each having a first end in engagement with one step and a second end in slidable engagement with a of neighboring steps are provided.

In one embodiment, a plurality of dual link assemblies each including a first and a second link each having a rack engageable with a drive unit are provided. The first link and second link each have one end pivotally connected to a front roller shaft, and the other end of the first link has a link roller and is pivotally connected to the other end of the second link on a neighboring step. A front roller guide rail may be secured to the main frame to extend along the circulating path for guiding the front roller, a rear roller guide rail may be disposed along the front roller guide rail for guiding a rear roller mounted on the step to maintain the step in a predetermined position, and a folding rail may be disposed along the front roller guide rail for guiding the link rollers on the dual link assembly for folding the dual link assembly into a folded position at the end portions of the main frame. The escalator apparatus may include intermediate plates each having one end in engagement with one and the other end in slidable engagement with a neighboring step and positioned between the steps when the dual link assembly is expanded in an elongated intermediate portion of the main frame.

In another embodiment, a dual-speed escalator apparatus comprises a main frame defining an elongated sloped circulating path and a plurality of steps disposed along the circulating path. Dual link assemblies including a first and a second link are provided. The first and second links each have one end pivotally connected to a front roller shaft on a step, and the other end of the first link has a link roller and is pivotally connected to the other end of the second link on a neighboring step. The escalator apparatus further comprises a front roller guide rail extending along the circulating path, a rear roller guide rail disposed along the front roller guide rail for maintaining each step in a predetermined position, and a folding rail disposed along the front roller guide rail for guiding the link rollers on the dual link assembly so as to fold the dual link assembly into a folded position at the end portions of the circulating path. Intermediate plates are provided each having a first end in engagement with one step and a second end in slidable engagement with a neighboring step, and positioned between the steps when the dual link assembly is expanded in an elongated intermediate portion of the main frame. Alternating, a step chain having a rack may be disposed along the circulating path so as to connect the steps in an endless loop, and a drive unit for driving the step chain may be mounted at a midpoint of the length of the main frame.

BRIEF DESCRIPTION OF THE DRAWINGS

The present invention will become more readily apparent from the following detailed description of the preferred embodiment of the present invention considered in conjunction with the accompanying drawings, in which.

DESCRIPTION OF THE PREFERRED EMBODIMENTS

Figure 13:
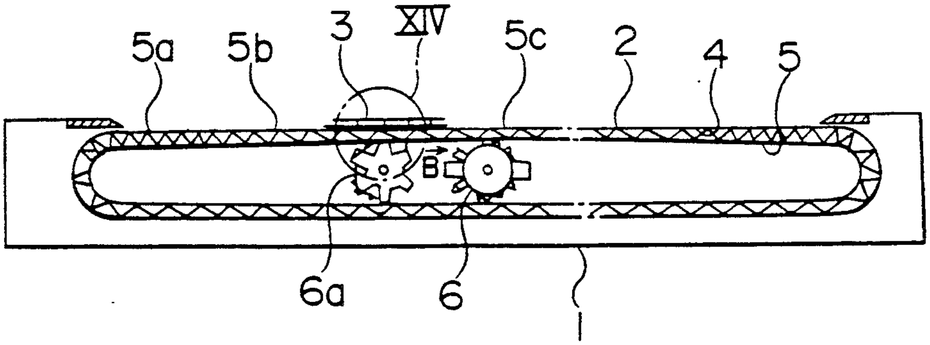
FIG. 13 PRIOR ART
FIG. 13 is a schematic side view illustrating a conventional dual-speed moving walk.
Figure 14:
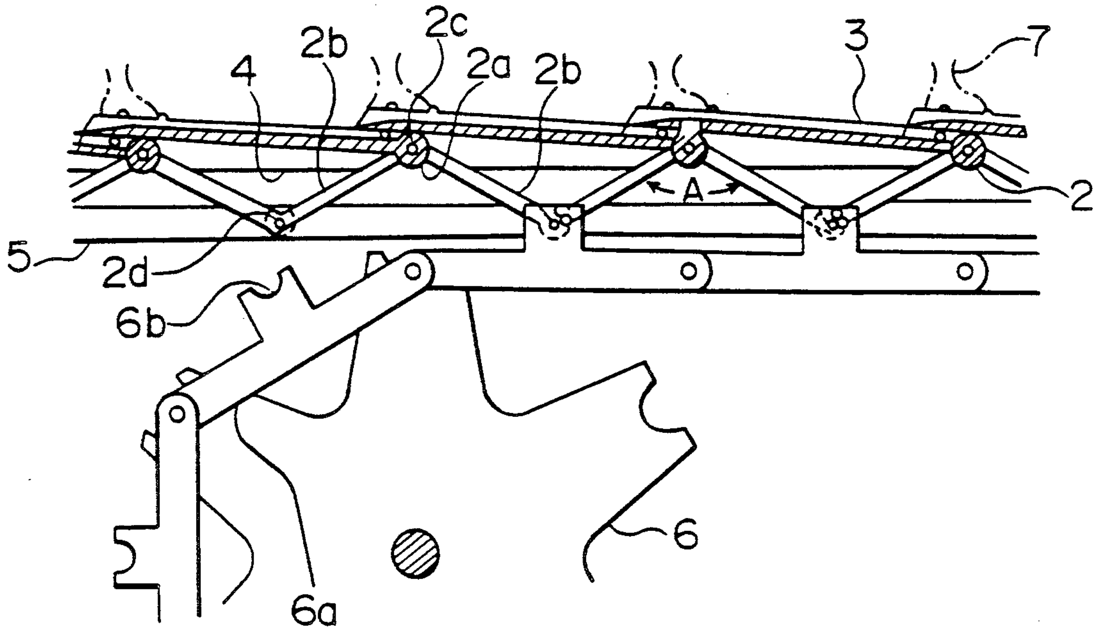
FIG. 14 PRIOR ART
FIG. 14 is an enlarged view of region XV of FIG. 13.

FIGS. 1 to 11 are views illustrating one embodiment of present invention, in which the reference numerals common to those in FIGS. 13 and 14 designate identical or corresponding components. The escalator apparatus comprises a main frame 1 disposed in a tilted position and having a landing 1*a* at each of its opposite ends. The main frame 1 defines an elongated and sloped circulating path 8 having an upper load-bearing run 8*a*, a lower return run 8*b*, and a turn-around portion 8*c* at each end of the circulating path 8.

Disposed along the circulating path 8 are a plurality of steps 9, each having a tread board 9*b* with cleats 9*c*, a riser 9*d* connected to one end of the tread board 9*b* and having cleats 9*c*, side plates 9*e*, front rollers 9*g* rotatably mounted on a front roller shaft 9*f* on the step 9 opposite to the riser 9*d*, and rear rollers rotatably mounted on the lower portion of the side plates 9*e* close to the riser 9*d*.

Figure 1:
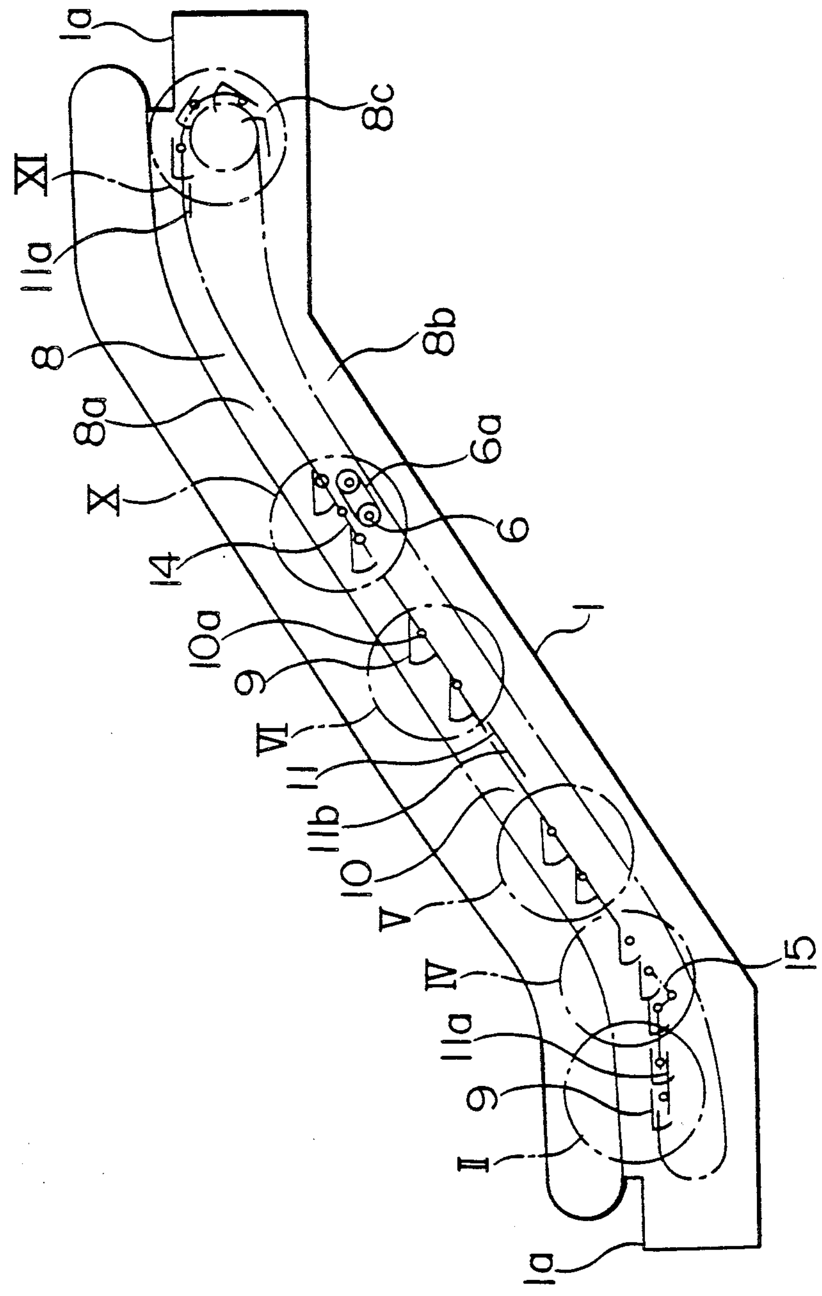
FIG. 1 is a schematic side view of one embodiment of the dual-speed escalator apparatus of the present invention.

A step chain 10 is disposed along the circulating path 8. The step chain 10 comprises a plurality of dual link assemblies 10*e* each having a first link 10*c* and a second link 10*d* pivotally connected to a roller shaft 10*b* of the roller 10*a*. Each of the links 10*c* and 10*d* has formed on its lower side a rack 10*f*, and each dual link assembly 10*e* is pivotally connected at its opposite ends to the front roller shafts 9*f* of the two neighboring steps 9 so that all the steps 9 are connected in an endless loop. As shown in FIG. 1, a drive unit 6 is disposed in the main frame 1 for engaging and driving the rack 10*f* on the links 10*c* and 10*d* through an endless drive chain 6*a*.

The main frame 1 has mounted thereon a front roller guide rail 11 disposed along the circulating path 8 so as to have an upper and a lower horizontal portions 11*a* at the landings 1*a* and a sloped portion 11*b* between the horizontal portions 11*a* for guiding the front roller 9*g*.

The main frame 1 has also mounted thereon a rear roller guide rail 12 disposed along the front roller guide rail 11 for guiding a rear roller 9*h*. In the sloped section corresponding to sloped section 11*b*, the rear roller guide rail 12 is disposed at the same level as the front roller guide rail 11*b* so that the steps 9 are moved along the sloped path while their tread boards are maintained in a horizontal position. In a horizontal section corresponding to horizontal section 11*a*, the rear roller guide rail 12 is positioned lower than the front roller guide rail 11 so that the steps 9 are moved horizontally with the tread maintained in a horizontal position.

The main frame 1 has further mounted thereon a folding rail 13 disposed along the front roller guide rail 11 for supporting and guiding the roller 10*a* rotatably mounted on the shaft 10*b* connecting the first and the second links 10*c* and 10*d*. In a section corresponding to horizontal section 11*a*, the folding rail 13 is disposed below the front roller guide rail 11 so that the dual link assemblies 10*e* are folded, and in a section corresponding to sloped section 11*b*, the folding rail 13 gradually approaches the same level as the front roller guide rail 11 so that the dual link assemblies 10*e* are gradually extended into a straight position.

Figure 3:
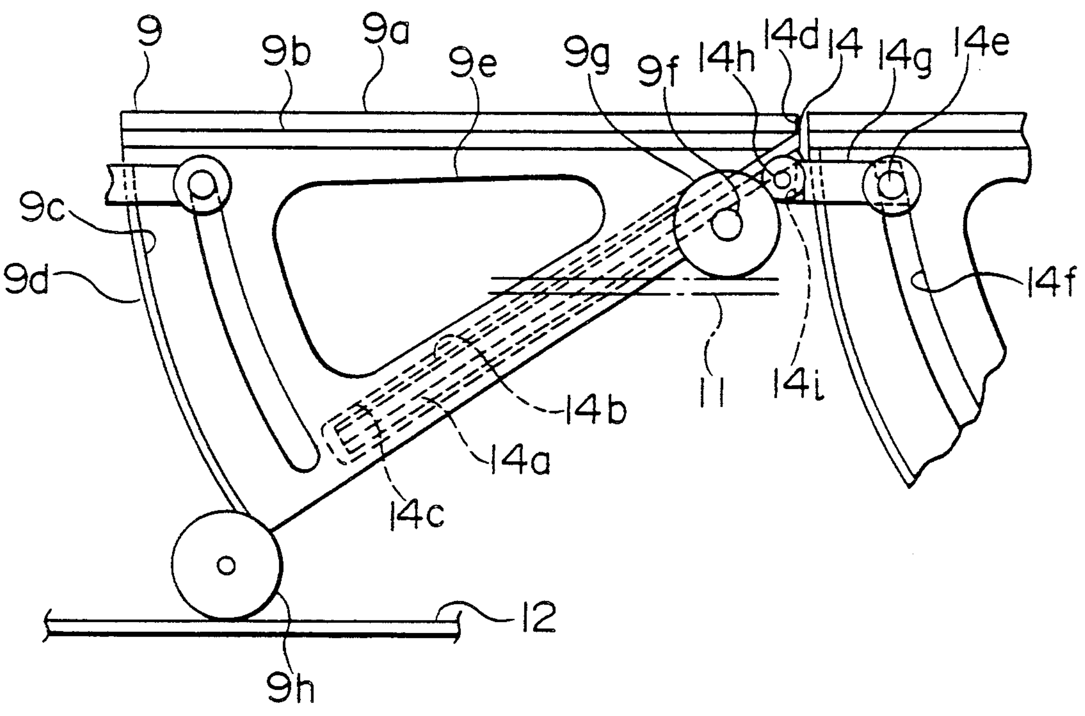
FIG. 3 is an enlarged view of the main portion of FIG. 2.
Figure 4:
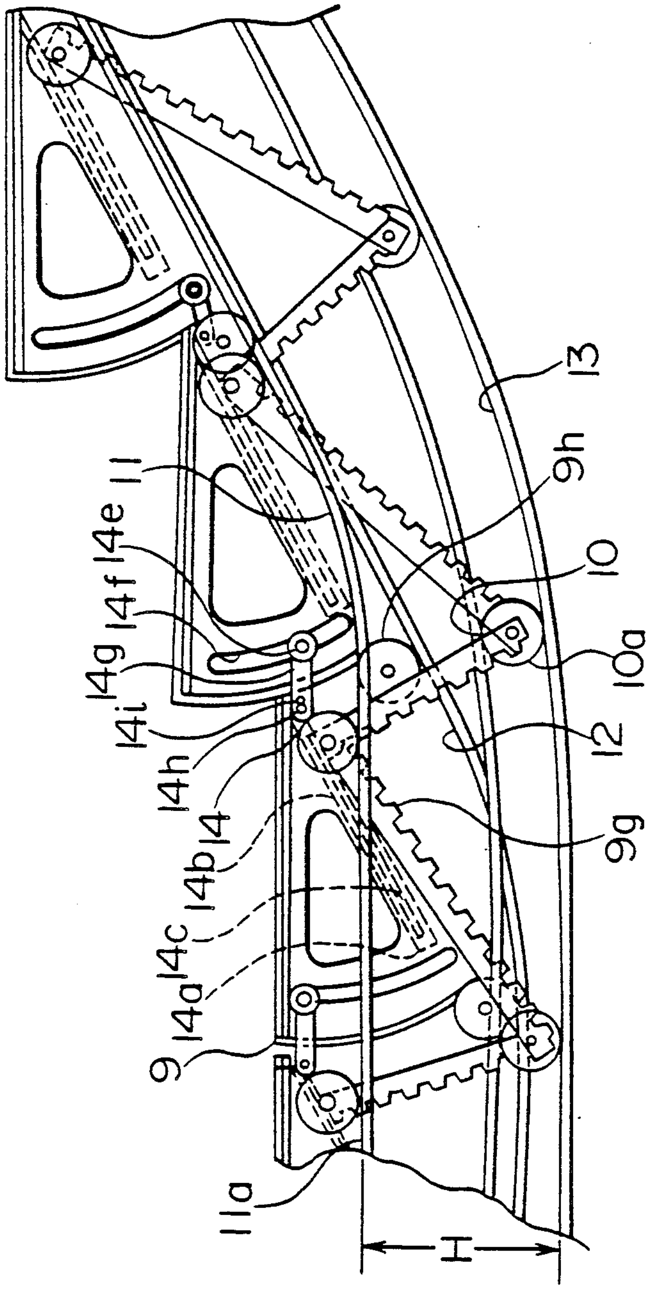
FIG. 4 is an enlarged view of region IV of FIG. 1.
Figure 5:
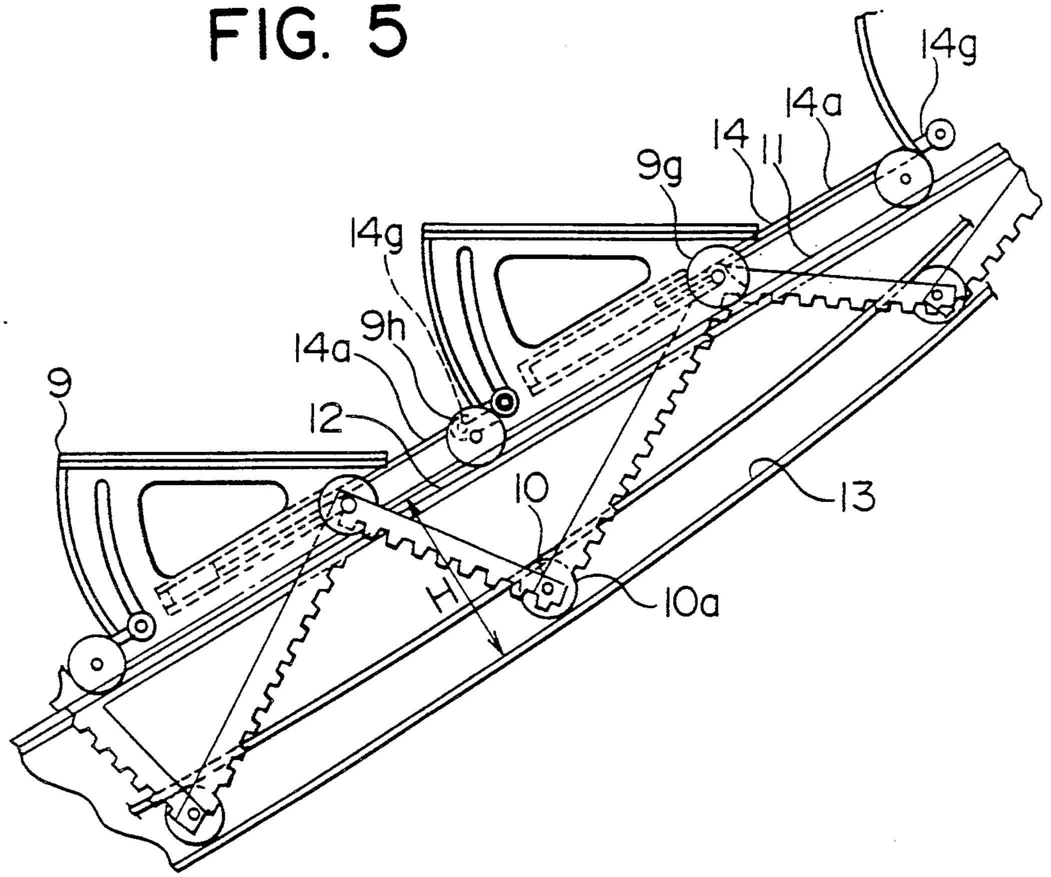
FIG. 5 is an enlarged view of region V of FIG. 1.
Figure 6:
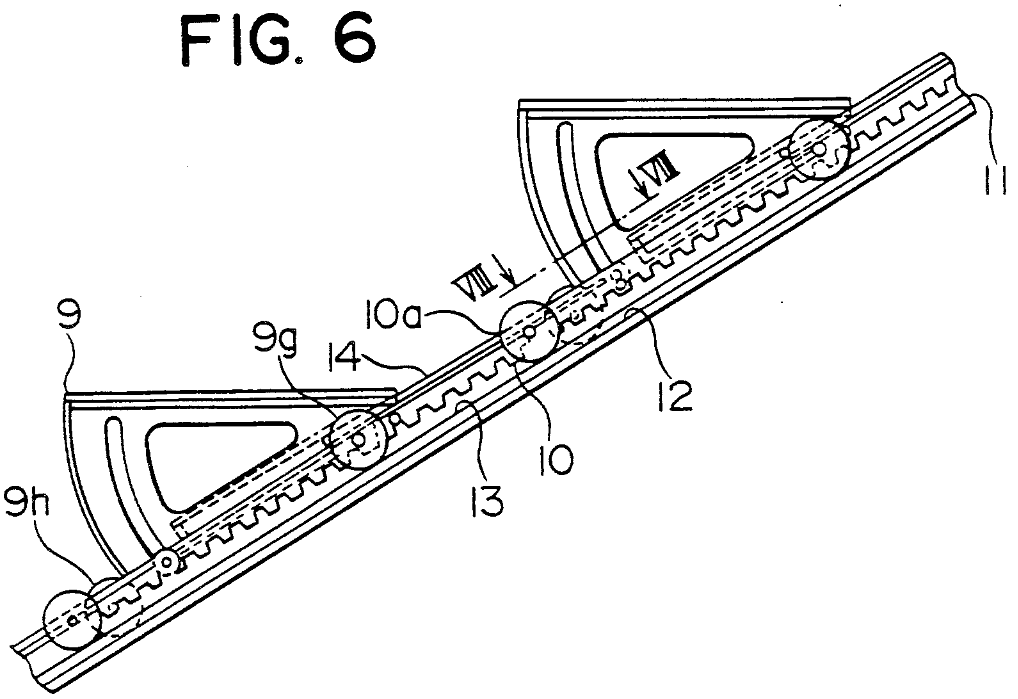
FIG. 6 is an enlarged view of region VI of FIG. 1.
Figure 7:
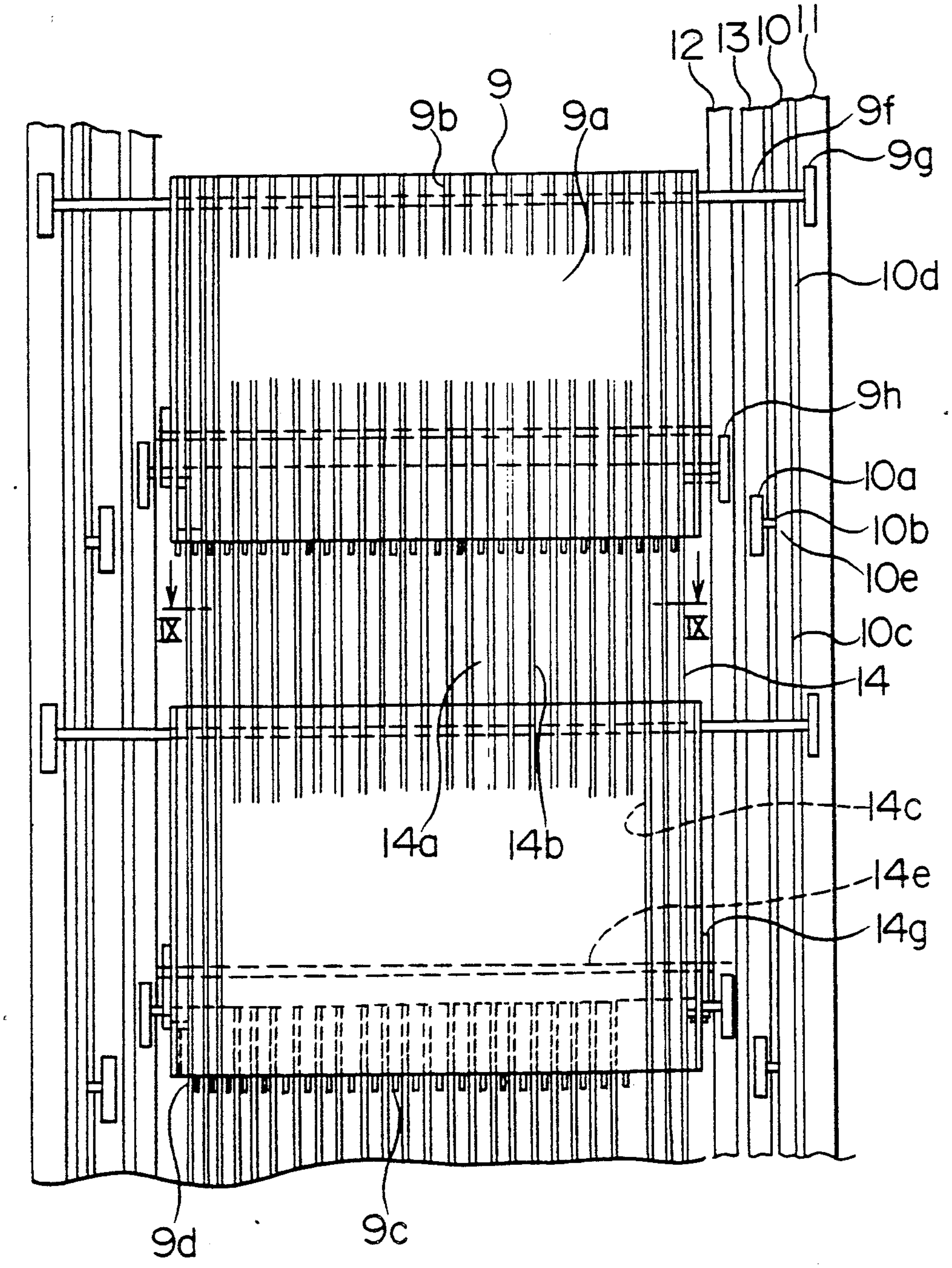
FIG. 7 is a plan view of FIG. 6.
Figure 8:
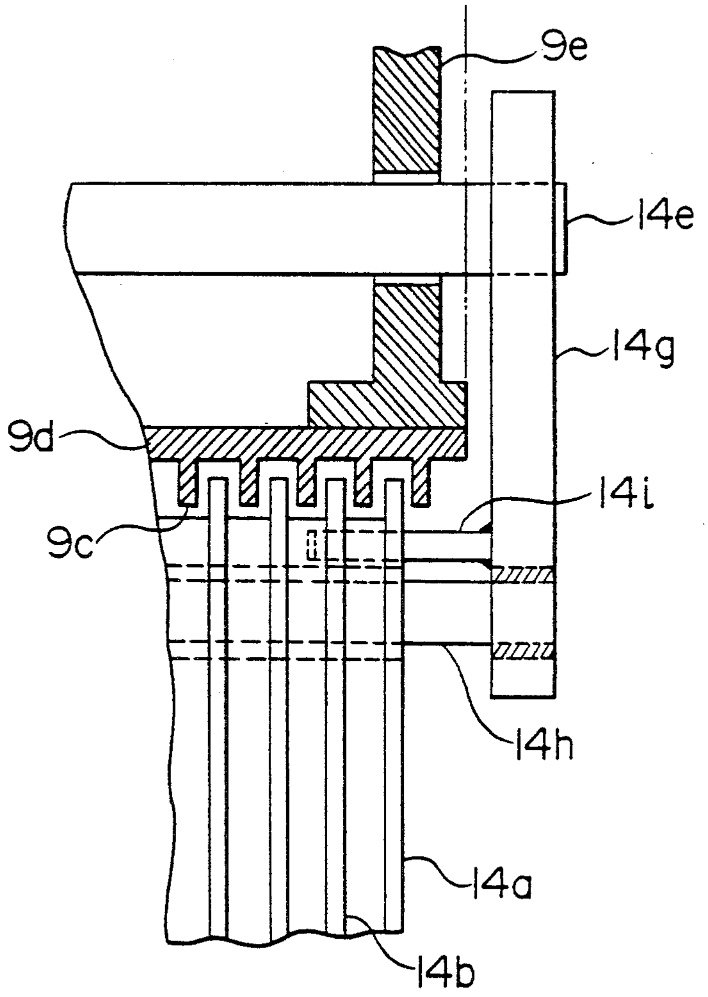
FIG. 8 is an enlarged sectional view taken along line VIII—VIII of FIG. 6.
Figure 9:
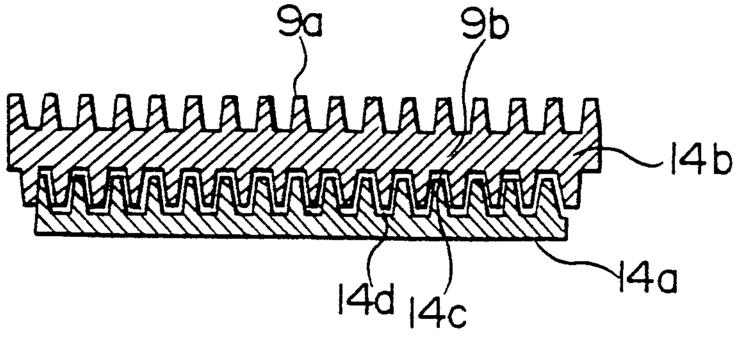
FIG. 9 is an enlarged sectional view taken along line IX—IX of FIG. 7.
Figure 10:
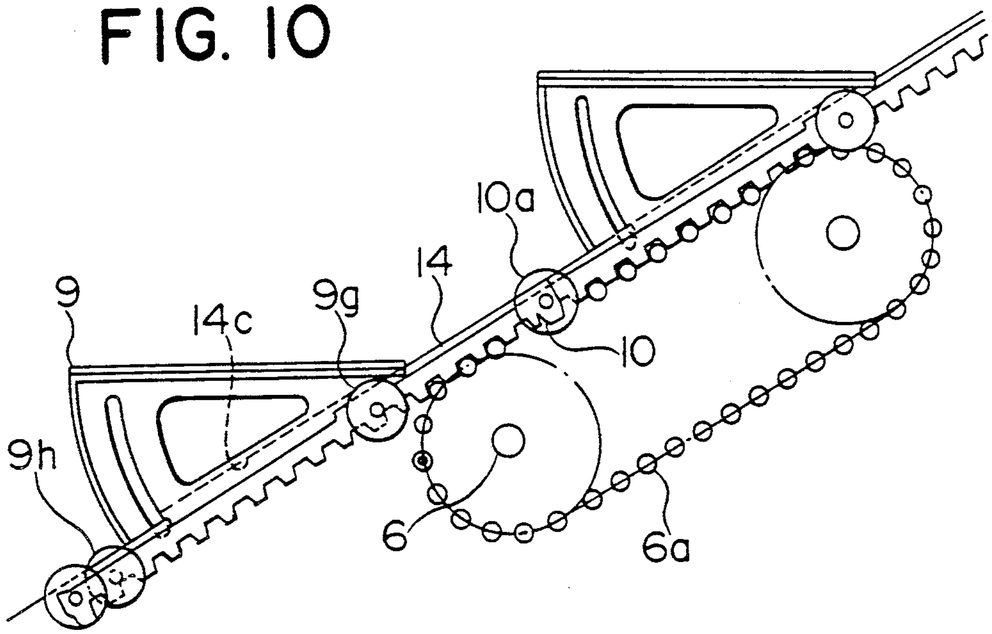
FIG. 10 is an enlarged view of region X of FIG. 1.

Disposed between neighboring steps 9 are intermediate plates 14 each comprising a plate member 14*a* having formed thereon cleats 14*b* and being slidably received within a pocket or a recess 14*c* formed in the lower portion of the step 9, as best seen from FIG. 3. The recess 14*c* also has a comb plate 14*d* having a shape complementary to the cleats 14*b* formed in the portion corresponding to the cleats 14*b* of the intermediate plate 14. One end of each intermediate plate 14 is pivotally connected by a pin 14*h* to one end of a link 14*g*, and the other end of the link 14*g* is slidably connected to the step 9 through an arcuate slot 14*f* extending along the riser 9*d* of the step side plate 9*e* and a pin 14*e* secured to the other end of the link 14*g* and slidably engaging the arcuate slot 14*f*. The link 14*g* has a projecting stop 14*i* opposing the plate member 14*a* of the intermediate plate 14 for engaging the plate member 14*a* and preventing it from pivoting beyond a predetermined angular position relative to the link 14*g* as illustrated in FIG. 5. The roller 10*a*, the dual link assembly 10*e*, the folding rail 13, and the like constitute the main portion of a variable connection mechanism 15.

Figure 2:
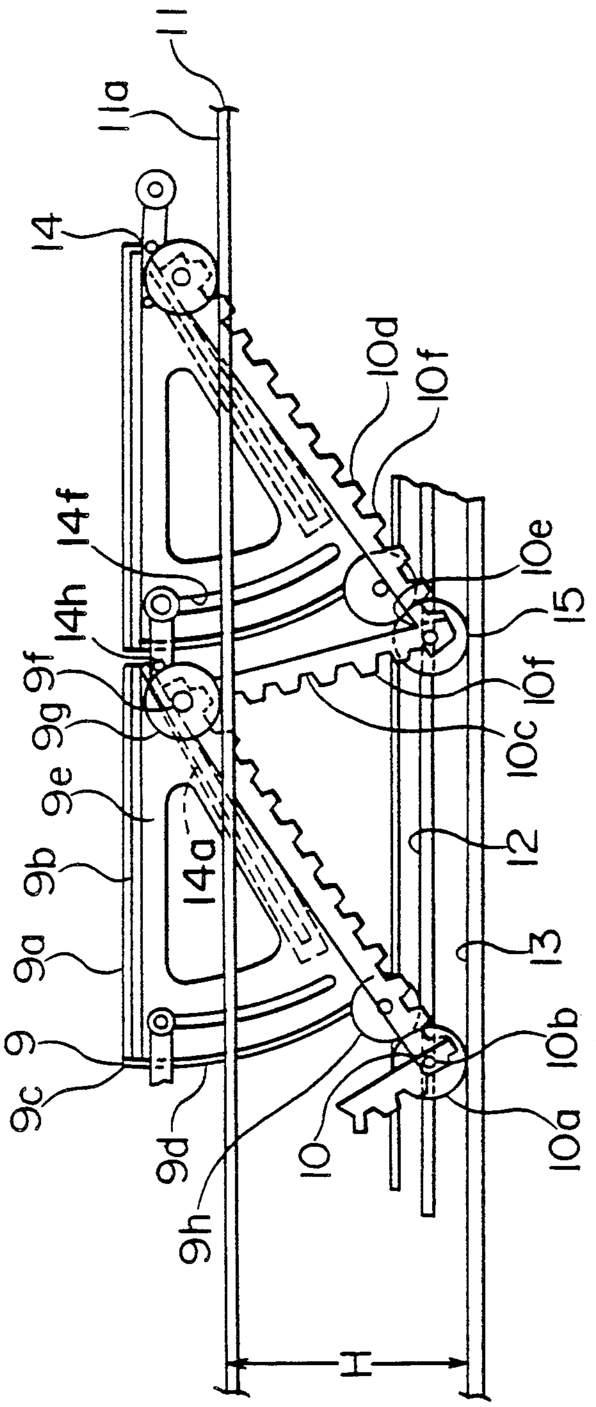
FIG. 2 is an enlarged view of region II of FIG. 1.
Figure 11:
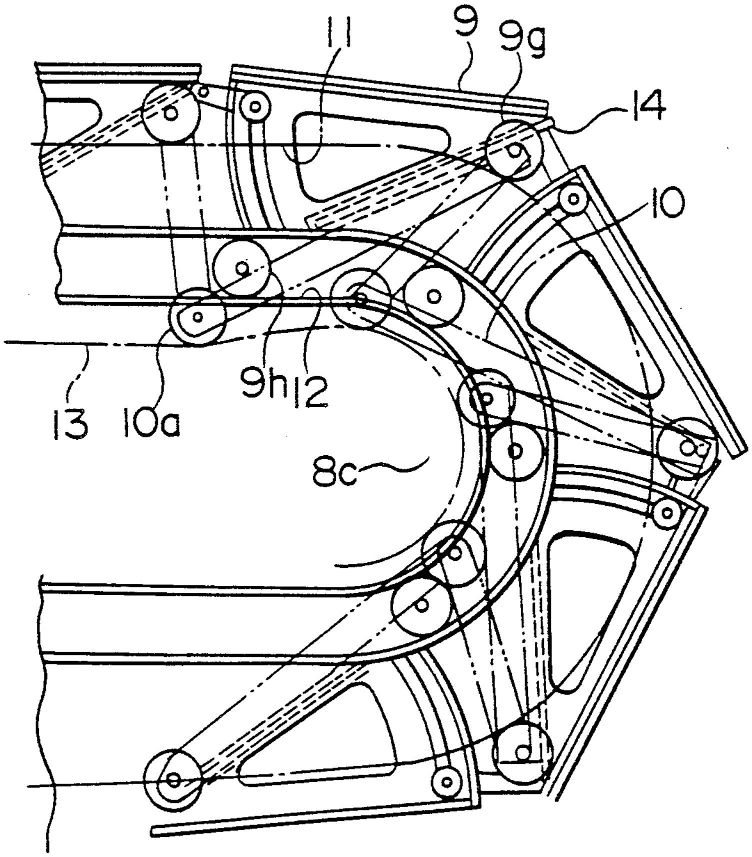
FIG. 11 is an enlarged view of region XI of FIG. 1.

In the dual-speed escalator apparatus constructed as described above, the drive unit 6 drives the step chain 10 through the rack 10*f* in the sloped section 11*b* in which the dual link assembly 10*e* is in a straight position. In one of the horizontal sections 11*a*, the folding rail 13 is positioned below the front roller guide rail 11 by a distance H as illustrated in FIG. 2, so the dual link 10*e* is folded into the shape of a "V" and the steps 9 are positioned close with each other. When the steps 9 are positioned in contact to each other, the entire plate member 14*a* is accommodated within the recess 14*c*. As the steps 9 moves to pass through the bent portion of the front roller guide rail 11 into the sloped section 11*b* illustrated in FIG. 5, the distance H between the rails gradually decreases so that the dual link assembly 10*e* is unfolded and extended to gradually move the steps 9 away from each other so that the dual link assembly varies from the state illustrated in FIG. 4 to the states illustrated in FIG. 5 and FIG. 6. As the dual link 10*e* extends or is unfolded, the plate member 14*a* is withdrawn from the recess 14*c* so that the intermediate plate 14 is disposed between the two neighboring but separated steps 9. As the steps 9 approach the other horizontal section 11*a*, the distance H between the rails gradually increases so that the dual link assembly 10*e* is folded to position the steps 9 closer to each other, whereby the intermediate plate 14 is inserted into the recess 14*c*. In the turn-around portion 8 of the circulating path, the steps 9 are turned around to return to the starting position as illustrated in FIG. 11.

The following equations apply:

$L3 = L1 + L2$ and $V2 = L3/L2 \times V1$ $L3/L2$ = speed ratio where,

V1: speed of step 9 in horizontal section 11*a*

L1: length of first link 10*c*

L2: length of second link 10*d*

L3: distance between steps 9 in sloped section 11*b*

V2: speed of step 9 in sloped section 11*b*,

Since the value of L1 is limited by the depth of the recess 14*c*, L3 is usually 1.6 times the depth of the step 9. However, the speed ratio L3/L2 can be further increased by employing a telescopically extendable plate member 14*a*.

When the speed ratio $= 1.6$ and $V1 = 30$ m/min, $V2 = 48$ m/min.

Also, since the intermediate plate 14 is connected to the step 9 through the arcuate slot 14*f* and the connecting link 14*g* slidably engaging therein, horizontal movement and skewed movement of the steps 9 can be easily accommodated by the movement of the shaft 14*e* along the slot 14*f*. The turned around of the steps 9 in the turn-around portion 8*c* is easily achieved as illustrated in FIG. 11 because the connecting link 14*g* is pivotally connected to the plate member 14*a*.

The intermediate plate 14 has a stop 14*i* for limiting the pivotal movement of the plate member 14*a* relative to the connecting link 14*g*, so the intermediate plate 14 is not folded downward even in the fully extended position when a passager steps on it. Also, since the cleats 9*c* on the riser 9*d* are kept in mesh with the cleats 14*b* on the plate member 14*a* during the relative movement between the plate member 14*a* and the riser 9*d*, a higher safety can be obtained. It is preferable that the intermediate plate 14 be colored yellow, for example, to indicate that the passenger should not step on it.

As described, the step chain 10 is driven through the rack 10*f* of the dual link assembly 10*e* extended in a straight position when the steps 9 are moved at a higher speed. Therefore, a dual-speed escalator apparatus which can be operated smoothly and silently can be made less expensive with a relatively simple structure.

Figure 12:
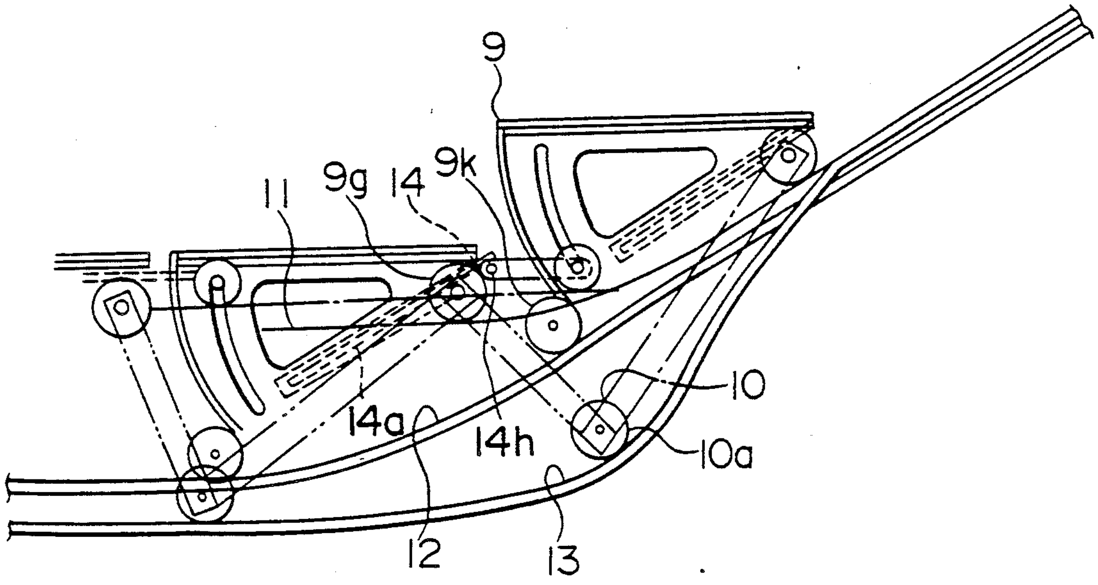
FIG. 12 is a side view similar to FIG. 4 but illustrating another embodiment of the dual-speed escalator apparatus of the present invention.

FIG. 12 illustrates another embodiment of the dual-speed escalator apparatus of the present invention, in which the same reference numerals used in FIGS. 1 to 11 designate identical or corresponding components. The dual-speed escalator apparatus illustrated in FIG. 12 comprises a folding rail 13 which has a bent portion with a small radius of curvature defined between a horizontal section corresponding to the horizontal section 11*a* of the front roller guide rail 11 and a sloped section corresponding to the sloped section 11*b* of the front roller guide rail 11.

In this embodiment also, the step chain 10 is driven through the dual link assembly 10*e* extended in a straight position, so operation of the escalator apparatus is similar to that of the previous embodiment described and illustrated in conjunction with FIGS. 1 to 11. In the embodiment illustrated in FIG. 12, however, the speed of the unfolding of the dual link assembly 10*e* and therefore the speed of separation and acceleration of the steps 9 at the bent portion of the rail are large.

While the dual link assembly is attached to each of the steps in the above embodiments, the dual link assembly may also be connected to every other step, for example. In this case, the steps to which no dual line assembly is attached are positioned and driven by the steps on both sides thereof.

As has been described, intermediate plates are disposed between steps in such a manner that the plates are accommodated within the steps. Also, the steps are connected through the dual link assemblies, and a folding rail is provided for guiding and displacing the roller at the knee joint of the dual link assembly to fold and extend the dual link assembly so that the dual link assemblies are extended to accelerate the steps as the steps move from the horizontal section to the sloped section and so that the steps are driven through the rack of the extended dual link assemblies and the intermediate plate is bridged between the accelerated steps. With this construction, a silent and smooth dual-speed escalator apparatus can be constructed with a simple structure.

What is claimed is:

1. A dual-speed escalator apparatus comprising:

a main frame defining an elongated sloped circulating loop path having an upper load-bearing run and a lower return run;

a plurality of steps disposed along said circulating loop path adjacent one another;

a variable connecting mechanism connecting said steps in an endless loop; and an intermediate plate having a first end connected to and movable relative to a first one of said steps and a second end in slidable engagement with a second one of said steps adjoining said first one of said steps.

2. A dual-speed escalator apparatus as claimed in claim 1 wherein said first one of said steps has a riser and a slot extending along said riser, and said first end of said intermediate plate is movably connected to said slot.

3. A dual-speed escalator apparatus as claimed in claim 2 wherein said intermediate plate has an engaging portion engaging a slot in said one of the neighboring steps and a plate contained in said step of the other of the neighboring steps, said engaging portion and said plate being foldably connected to permit rotation in a predetermined direction, said intermediate plate further having a preventing means for preventing rotation of the plate and the engaging portion in a direction opposite to the prescribed direction.

4. A dual-speed escalator apparatus as claimed in claim 2 wherein said intermediate plate comprises a plate portion slidably disposed in said second one of said steps and a link having a first end slidably connected to said slot in said first one of said steps and a second end pivotably connected to said plate portion.

5. A dual-speed escalator apparatus as claimed in claim 4 wherein said slot in said first one of said steps is spaced from and substantially parallel to said riser.

6. A dual-speed escalator apparatus as claimed in claim 1 wherein said second one of said steps has a recess formed therein and said second end of said intermediate plate is slidably received in said recess.

7. A dual-speed escalator apparatus as claimed in claim 6 wherein said second one of said steps has a tread board and said recess extends transversely with respect to said tread board into said second one of said steps.

8. A dual-speed escalator apparatus as claimed in claim 7 wherein said recess guides said second end of said intermediate plate for reciprocating movement within said recess.

9. A dual-speed escalator apparatus as claimed in claim 1 wherein said variable connecting mechanism comprises:

- a plurality of dual link assemblies, each comprising a first link having a first end pivotably connected to one of said steps and a second end, and a second link having a first end pivotably connected to one of said steps and a second end pivotably connected to the second end of one of said links;
- a plurality of link rollers, each of which is rotatably connected to one of said dual link assemblies; and
- a folding rail disposed along said main frame for supporting said link rollers and shaped so as to fold and unfold said dual link assemblies as said steps move along said circulating loop 10. A dual-speed escalator apparatus as claimed in claim 9 wherein each of said first and second links has a rack formed on a surface thereof, the apparatus further comprising drive means for driving said steps by engaging with said racks.

11. A dual-speed escalator apparatus comprising:

- a main frame defining an elongated sloped circulating loop path having an upper load-bearing run and a lower return run;
- a plurality of steps disposed along said circulating loop path on said main frame;
- a plurality of dual link assemblies each including a first and a second link each having a rack engageable with a drive unit, said first link and second link each having one end pivotably connected to a front roller shaft, the other end of said first link having a link roller and being pivotally connected to the other end of said second link on one of neighboring steps;
- a front roller guide rail secured to said main frame to extend along said circulating path for guiding said front roller;
- a rear roller guide rail disposed along said front roller guide rail for guiding a rear roller mounted to said step to maintain said step in a predetermined position;
- a folding rail disposed along said front roller guide rail for guiding said link rollers on said duel link assembly for folding said dual link assembly into a folded position at the end portions of said main frame; and
- intermediate plates each having one end in engagement with one of neighboring steps and the other end in slidable engagement with the other of neighboring steps, and positioned between said steps when said dual link assembly is expanded in an elongated intermediate portion of said main frame.

12. A dual-speed escalator apparatus as claimed in claim 11 wherein said intermediate plate connects the neighboring steps.

13. A dual-speed escalator apparatus as claimed in claim 12 wherein one end of said intermediate plate engages with the neighboring step through a slot formed in an edge portion of the neighboring step, and the other end of said intermediate plate slidably engages with the receiving portion of the other neighboring steps.

14. A dual-speed escalator apparatus as claimed in claim 13 wherein said intermediate plate has an engaging portion engaging a slot in said one of the neighboring steps and a plate contained in said step of the other of the neighboring steps, said engaging portion and said plate being foldably connected to permit rotation in a predetermined direction, said intermediate plate further having a preventing means for preventing the rotation of the engaging portion and the plate in a direction opposite to the prescribed direction.

15. A dual-speed escalator apparatus as claimed in claim 11 wherein said dual link assembly is allowed to be in a straight extended position at a substantially midpoint of the length of said main frame.

16. A dual-speed escalator apparatus as claimed in claim 15 wherein said dual link assembly meshes with said drive unit when said dual link is extended into a straight line.

17. A dual-speed escalator apparatus comprising:

- a main frame defining an elongated sloped circulating loop path having an upper load-bearing run and a lower return run;
- a plurality of steps disposed along said circulating loop path on said main frame;
- a plurality of dual link assemblies each including a first and a second link, said first link and second link each having one end pivotally connected to a front roller shaft, the other end of said first link having a link roller and being pivotally connected to the other end of said second link on one of neighboring steps;
- a step chain disposed along said circulating path and connecting said steps in an endless loop, said step chain having a rack;
- a drive unit mounted at a substantially midpoint of the length of said main frame and engaging with said rack of said step chain;
- a front roller guide rail secured to said main frame to extend along said circulating path for guiding said front roller;

a rear roller guide rail disposed along said front roller guide rail for guiding a rear roller mounted to said step to maintain said step in a predetermined position;

a folding rail disposed along said front roller guide rail for guiding said link roller on said dual link assembly, said folding rail separating away from said front roller guide rail in the direction crossing said front roller guide rail at the end portions of said main frame for folding said dual link assembly into a folded position; and intermediate plates each having one end in engagement with one of neighboring steps and the other end in slidable engagement with the other of neighboring steps, said intermediate plate being received within said slidably engaged step when said dual-speed link assembly is folded, and said intermediate plate being position between said steps when said dual-speed link assembly is extended in an elongated intermediate portion of said main frame.

18. A dual-speed escalator apparatus as claimed in claim 17 wherein one end of said intermediate plate is held through the slot formed in said step edge portion.

19. A dual-speed escalator apparatus as claimed in claim 18 wherein said intermediate plate has an engaging portion engaging a slot in said one of the neighboring steps and a plate contained in said step of the other of the neighboring steps, said engaging portion and said plate being foldably connected to permit rotation in a predetermined direction, said intermediate plate further having a preventing means for preventing the rotation of the engaging portion and the plate in a direction opposite to the prescribed direction.

20. A dual-speed escalator as claimed in claim 17 wherein said dual link assembly is allowed to be in a straight extended position at a substantially midpoint of the length of said main frame.

* * * * *

UNITED STATES PATENT AND TRADEMARK OFFICE
CERTIFICATE OF CORRECTION

PATENT NO. : 5,115,899

DATED : May 26, 1992

INVENTOR(S) : Hiroshi Nakatani

It is certified that error appears in the above-identified patent and that said Letters Patent is hereby corrected as shown below:

Title page, item [57], Abstract, line 20, after "with" insert --a--;
line 24, change "correct" to --connect--.

Signed and Sealed this

Thirty-first Day of August, 1993

Attest:

Bruce Lehman

BRUCE LEHMAN

*Attesting Officer* *Commissioner of Patents and Trademarks*